(12) United States Patent
Lloyd et al.

(10) Patent No.: US 11,314,510 B2
(45) Date of Patent: *Apr. 26, 2022

(54) TRACKING LOAD AND STORE INSTRUCTIONS AND ADDRESSES IN AN OUT-OF-ORDER PROCESSOR

(71) Applicant: International Business Machines Corporation, Armonk, NY (US)

(72) Inventors: Bryan Lloyd, Austin, TX (US); Samuel David Kirchhoff, Austin, TX (US); Brian Chen, Austin, TX (US); Kimberly M. Fernsler, Cedar Park, TX (US); David A. Hrusecky, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,070

(22) Filed: Aug. 14, 2020

(65) Prior Publication Data

US 2022/0050680 A1 Feb. 17, 2022

(51) Int. Cl.
*G06F 9/30* (2018.01)
*G06F 12/0895* (2016.01)
(Continued)

(52) U.S. Cl.
CPC ...... *G06F 9/30043* (2013.01); *G06F 9/30047* (2013.01); *G06F 9/3855* (2013.01);
(Continued)

(58) Field of Classification Search
CPC .................................................. G06F 9/30043
See application file for complete search history.

(56) References Cited

U.S. PATENT DOCUMENTS 6,484,254 B1 11/2002 Chowdhury et al.
7,506,195 B2 3/2009 Takahashi et al.
(Continued)

FOREIGN PATENT DOCUMENTS

WO 2015168141 A1 11/2015
WO 2019245896 A1 12/2019

OTHER PUBLICATIONS

Office Action received in a related U.S. Patent Application, namely U.S. Appl. No. 17/002,378, 5 pages.

*Primary Examiner* — Michael J Metzger
(74) *Attorney, Agent, or Firm* — Scully, Scott, Murphy & Presser, P.C.

(57) ABSTRACT

A computer system, processor, and/or load-store unit has a data cache for storing data, the data cache having a plurality of entries to store the data, each data cache entry addressed by a row and a Way, each data cache row having a plurality of the data cache Ways; a first Address Directory organized and arranged the same as the data cache where each first Address Directory entry is addressed by a row and a Way where each row has a plurality of Ways; a store reorder queue for tracking the store instructions; and a load reorder queue for tracking load instruction. Each of the load and store reorder queues having a Way bit field, preferably less than six bits, for identifying the data cache Way and/or a first Address Directory Way where the Way bit field acts as a proxy for a larger address, e.g. a real page number.

25 Claims, 9 Drawing Sheets

(51) Int. Cl.
  *G06F 9/38* (2018.01)
  *G06F 12/0817* (2016.01)
  *G06F 12/0875* (2016.01)
(52) U.S. Cl.
  CPC ...... *G06F 12/0817* (2013.01); *G06F 12/0875* (2013.01); *G06F 12/0895* (2013.01); *G06F 2212/608* (2013.01)

(56) References Cited

U.S. PATENT DOCUMENTS

| | | |
|---|---|---|
| 9,244,755 B2 | 1/2016 | Huang et al. |
| 9,400,752 B1 * | 7/2016 | Alexander .......... G06F 12/0833 |
| 9,880,849 B2 | 1/2018 | Ashcraft et al. |
| 10,162,696 B2 | 12/2018 | Kogan-Katz et al. |
| 10,198,265 B2 | 2/2019 | Zeng |
| 10,346,229 B2 | 7/2019 | Tee et al. |
| 2014/0281116 A1 | 9/2014 | Abdallah et al. |
| 2016/0253229 A1 | 9/2016 | Sade et al. |
| 2017/0013003 A1 | 1/2017 | Samuni et al. |
| 2019/0179641 A1 * | 6/2019 | Philhower ............. G06F 9/3804 |
| 2019/0258489 A1 | 8/2019 | Horsnell et al. |

* cited by examiner

TRACKING LOAD AND STORE INSTRUCTIONS AND ADDRESSES IN AN OUT-OF-ORDER PROCESSOR

BACKGROUND OF INVENTION

The present invention generally relates to data processing and information handling systems, processors, and more specifically to handling store and load operations in a processor, including address tracking in a load-store unit (LSU) of a processor.

Modern information and data handling systems often execute instructions out-of-order to achieve greater processing efficiency. Processors typically are "pipelined" to handle executing instructions out-of-order and have multiple elements that operate in parallel to process multiple instructions in a single processing cycle. Pipelining involves processing instructions in stages, so that the pipelined stages may process a number of instructions concurrently. Executing instructions out-of-order creates additional complexity in handling and processing instructions. Depending upon how the instructions are handled in out-of-order processors, processor latency and inefficiency may result.

Typically, the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers, queues, and caches to hold data, information and/or instructions for the execution units.

An execution slice may refer to a set of data processing circuitry or hardware units connected in series within a processor core. An execution slice may be a pipeline or pipeline-like structure. Multiple execution slices may be used as part of simultaneous multi-threading within a processor core. In modern computer architecture, there can be multiple execution units within an execution slice including load-store units (LSUs), vector-scalar units (VSUs), arithmetic logic units (ALUs), among other execution units. A LSU typically contains one or more store queues each having entries to track store instructions and hold store data, and one or more load queues each having entries to track load instructions and hold load data.

Typical memory reordering requirements are based upon real addresses referred to as physical addresses. Because memory reordering requirements are real address based, all loads and stores, in a typical processor will upon execution, go through effective address (sometimes referred to as logical address) to real address (RA) translation. In turn, the real address (RA) of each load or store instruction that is executed typically is stored in a Load Reorder Queue (LRQ) or a Store Reorder Queue (SRQ) entry associated with that load or store instruction where it will be tracked to detect load/store ordering hazards while the load or store instruction is in the out-of-order execution window of the processor's instruction sequencing process. Each entry in a L1 data cache typically stores a full real address (RA) as does the LRQ and SRQ. A typical width of a real address (RA) in a processor is 53 bits: RA (11:63). Tracking the real address (RA) in a processor, including in the LRQ and SRQ in a LSU, with such a large address field can be cumbersome, and create inefficiencies. Reallocation of entries in the LRQ and SRQ, and associated Data Cache, can also be problematic and create inefficiencies.

SUMMARY

The summary of the disclosure is given to aid understanding of a computer system, computer architectural structure, processor, load-store units (LSUs), and methods of allocating load and store instructions and address tracking in a load-store unit (LSU), and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, load-store units (LSUs), and their method of operation to achieve different effects.

A technique, method, processor, computer system, and/or programming instructions for processing information, including in an aspect tracking load and store instructions and addresses in a processor and/or load-store unit (LSU) is disclosed. In one or more embodiments, a computer system for processing information is disclosed where the computer system includes at least one computer processor where the processor has a load-store execution unit (LSU) for processing load and store instructions. The LSU in one or more embodiments includes: a data cache for storing data for use by the LSU, the data cache having a plurality of entries to store the data, each data cache entry addressed by a row representing a first portion of a first address type (e.g., an effective or logical address) and a Way identified by a Way bit field, each data cache row having a plurality of the data cache Ways; a first Address Directory to store a plurality of second portions of the first address type, corresponding to the data stored in the data cache, the first Address Directory having a plurality of entries equal in number to the plurality of data cache entries, each first Address Directory entry addressed by a row and a Way where each row has a plurality of Ways, the first Address Directory having a plurality of rows and a plurality of Ways equal in number to the plurality of data cache rows and the plurality of data cache Ways, each Way in the first Address Directory corresponding to a data cache Way, identified by the Way bit field, and containing the second portion of the first address type corresponding to and identifying a location in memory where the data stored in the corresponding data cache entry is located; a store reorder queue for tracking the store instructions in the LSU, the store reorder queue (SRQ) having a plurality of entries for storing information for tracking the store instructions, each store reorder queue entry having a Way bit field for identifying at least one of the group consisting of a data cache Way, a first Address Directory Way, and combinations thereof; and a load reorder queue (LRQ) for tracking load instructions in the LSU, the load reorder queue having a plurality of entries for storing information to track the load instructions in the LSU, each load reorder queue entry have a Way bit field for identifying at least one of the group consisting of a data cache Way, a first Address Directory Way, and combinations thereof. In an aspect, the Way bit field is less than six bits wide, and in a preferred embodiment is three bits wide, Way(0:2). The Way and its smaller bit field acts as a proxy for a larger address, e.g. a real page number (RPN), and permits out-of-order execution to be reduced in width.

The system, processor, and/or LSU, in an embodiment, is configured to: determine whether at least a second portion of an address of the load or store instruction matches one of the plurality of the second portions of the first address type stored in the first Address Directory; and in response to the at least a second portion of an address of the load or store instruction matching one of the plurality of the second portions of the first address type stored in the first Address Directory, supply the Way bit field of the second portion of the first address type stored in the first Address Directory that matches the at least second portion of an address of the load or store instruction to the store reorder queue or the load reorder queue. In an aspect, in response to the at least a second portion of the address of the load or store instruction not matching one of the plurality of the second portions of the first address type stored in the first Address Directory, allocate a data cache entry including a data cache Way to contain the data associated with the load or store instruction, and allocate a first Address Directory entry including a first Address Directory Way corresponding to the data cache entry and data cache Way. The system, processor, and/or LSU is further configured to in response to allocating a data cache entry and/or a first Address Directory entry, supply the store reorder queue or the load reorder queue at least one of: (a) the data cache Way bit field corresponding to the data cache Way that was allocated; (b) the first Address Directory Way bit field corresponding to the first Address Directory Way that was allocated; and (c) combinations thereof.

The system, processor, and/or LSU, in a further aspect can include a second Address Directory to store a plurality of second portions of a second address type, e.g., a real address, corresponding to the data stored in the data cache and corresponding to the second portion of the first address type (e.g., effective address) stored in the first Address Directory, the second Address Directory having a plurality of entries equal in number to the plurality of data cache entries and to the plurality of the first Address Directory entries, each second Address Directory entry addressed by a row and a Way where each row has a plurality of Ways, the second Address Directory having a plurality of rows and Ways equal in number to the plurality of data cache rows and data cache Ways and equal in number to the plurality of first Address Directory rows and first Address Directory Ways, each Way in the second Address Directory corresponding to a data cache Way and a first Address Directory Way, identified by the Way bit field, and containing the second portion of the second address type corresponding to and identifying a location in memory where the data stored in the corresponding data cache entry is located. In a further embodiment, the computer system, processor, and/or LSU is configured to: determine whether at least a second portion of an address of the load or store instruction matches one of the plurality of the second portions of the first address type stored in the first Address Directory; in response to at least a second portion of an address of the load or store instruction not matching one of the plurality of second portions of the first address type stored in the first Address Directory, determine whether at least a second portion of the address of the load or store instruction matches at least a portion of one of the plurality of the second address type contained in the second Address Directory; and in response to the at least the second portion of the address of the load or store instruction not matching at least one of the plurality of second portions of the second address type contained in the second Address Directory, allocate a data cache entry including a data cache Way to contain the data associated with the load or store instruction, allocate a first Address Directory entry including a first Address Directory Way corresponding to the data cache entry and data cache Way, and allocate a second Address Directory entry including a second Address directory Way corresponding to the first Address Directory entry and the first Address Directory Way. The system, processor, and/or LSU in an embodiment is further configured to in response to allocating a data cache entry and/or a first Address Directory entry, supply the store reorder queue or the load reorder queue at least one of: (a) the data cache Way bit field corresponding to the data cache Way that was allocated; (b) the first Address Directory Way bit field corresponding to the first Address Directory Way that was allocated; (c) the second Address Directory Way bit field corresponding to the second Address Directory Way that was allocated, and (d) combinations thereof.

The computer system, processor, and/or LSU, in an embodiment, implements an interlock between the reallocation of data cache Ways with a data cache way based tracking in the load reorder queue (LRQ) and store reorder queue (SRQ) entries. In one or more embodiments the computer system, processor, and/or LSU is configured to process data cache Ways associated with load instructions in the load reorder queue (LRQ) differently than the data cache Ways associated with store instructions in the store reorder queue (SRQ). In an aspect the computer system, processor, and/or LSU is configured to lock data cache Ways associated with store instructions in the store reorder queue (SRQ) to prevent reallocation of the store queue entry associated with locked data cache Ways. In this manner store instructions can read valid address data from the data cache directory, and increase processor efficiency. In a further aspect, the computer system, processor, and/or LSU is configured to reallocate to a second load instruction an entry in the load queue that is in use by a first load instruction. In this manner, the processor can take advantage of load instructions having a short lifetime in the load reorder queue (LRQ), and increase processor efficiency.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and/or embodiments of the information handling system, computer system, computer architectural structure, processor, load-store units (LSUs), and their method of operation will be better understood when read in conjunction with the figures provided. Embodiments are provided in the figures for the purpose of illustrating aspects, features, and/or various embodiments of the computer system, computer architectural structure, processor, load-store units (LSUs) and their method of operation, but the claims should not be limited to the precise arrangement, structures, features, aspects, embodiments, and/or devices shown, and the arrangements, structures, subassemblies, features, aspects, methods, processes, embodiments, methods, and/or devices shown may be used

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, processor pipelines, memory, execution units such as, for example, a load store unit (LSU), load reorder queues (LRQ), store reorder queues (SRQs), and data caches, e.g., a L1 data cache, and their method of operation, however, it will be understood by those skilled in the art that different and numerous embodiments of the computer system, computer architectural structure, processor, processor pipelines, load store units (LSUs), load reorder queues (LRQs), and store reorder queues (SRQs), data caches, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" when used in this specification, specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processor and microprocessor systems, architectures, and/or pipelines, which are apparent to those skilled in the art. It is assumed that those skilled in the art are familiar with the general architecture of processors, and in particular with processors which operate in an out-of-order execution fashion, including multi-slice processors and their use of execution units such as load store units (LSUs), load reorder queues (LRQs), and store reorder queues (SRQs), data caches, and address tracking and translation. It may be noted that a numbered element is numbered according to the figure in which the element is introduced, and is typically referred to by that number throughout succeeding figures.

Figure 1:
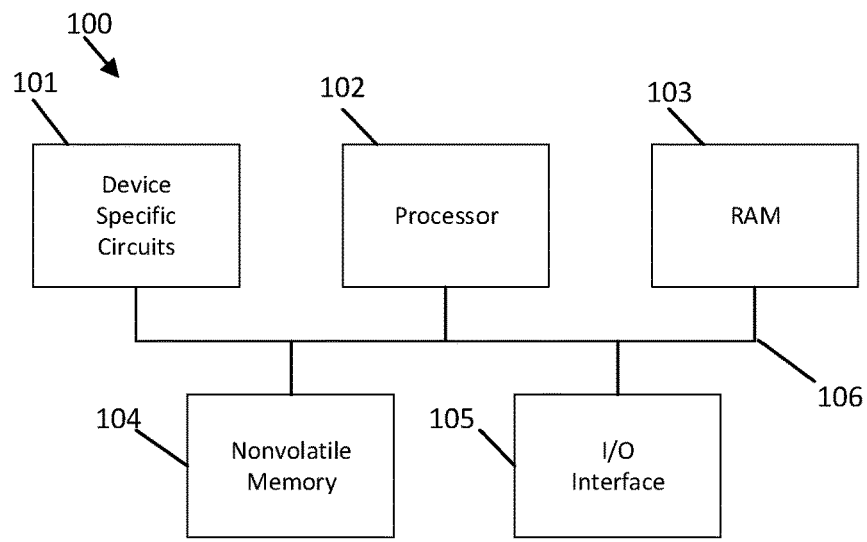
FIG. 1 illustrates an example of an embodiment of a data processing or information handling system in which aspects of the present disclosure may be practiced.

A computing or information handling (data processing) system 100 suitable for storing and/or executing program code may take many forms and in one embodiment may include at least one processor 102, e.g., a microprocessor, which may be or be part of a controller, coupled directly or indirectly to memory devices or elements through a system bus 106, as shown in FIG. 1. Computing or information handling system 100 in FIG. 1 is shown with a processor 102, Random Access Memory (RAM) 103, nonvolatile memory 104, device specific circuits 101, and 110 interface 105. Alternatively, the RAM 103 and/or nonvolatile memory 104 may be contained in the processor 102 as could the device specific circuits 101 and 110 interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM. In one embodiment, the RAM 103 may comprise Double Data Rate (DDR) synchronous DRAM or SDRAM. The RAM 103 may include memory devices arranged on a module, such as, for example, Dual Inline Memory Modules, also known as DIMMs.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface, e.g., as part of I/O interface 105, in any communication protocol such as, for example, Automation/Drive Interface (ADI).

Figure 2:
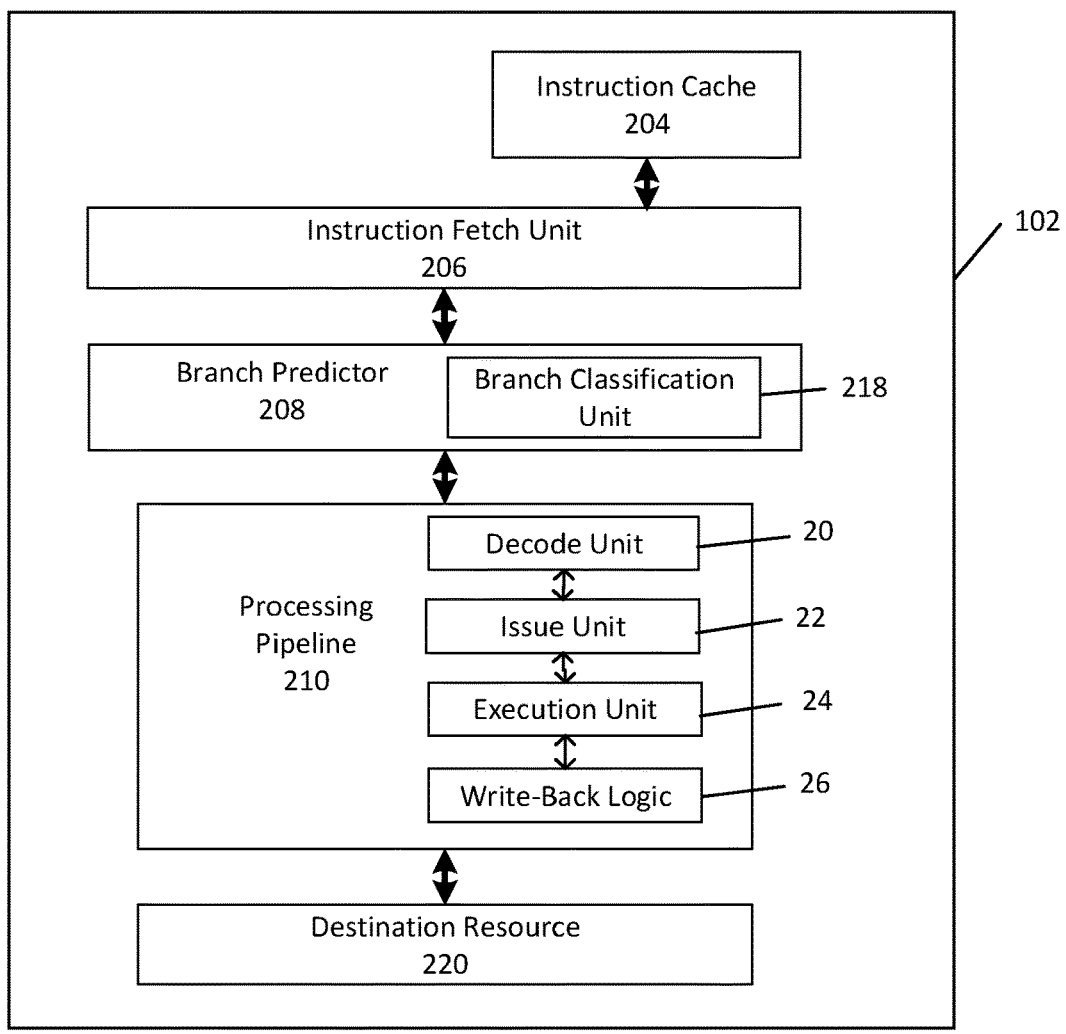
FIG. 2 illustrates a block diagram of an embodiment of a processor in which certain aspects of the present disclosure may be practiced.

FIG. 2 illustrates a simplified block diagram of an embodiment of a processor 102. In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102. The processor core may include other circuits, functional units, and components.

The instruction fetch unit 206 fetches instructions from the instruction cache 204 for further processing by the decode unit 20. The decode unit 20 decodes instructions and passes the decoded instructions, portions of instructions, or other decoded data to the issue unit 22. The decode unit 20 may include a dispatch unit to dispatch instructions to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The execution unit 24 performs and executes operations specified by the instructions issued to the execution unit 24. The execution unit 24 may include a plurality of execution units, such as fixed-point execution units, floating-point execution units, load-store execution units (LSUs), and vector scalar execution units. Execution unit 24 in addition, in embodiments, determines if the predicted branch direction is incorrect. When a mispredicted branch instruction is detected, instructions subsequent to the mispredicted branch are discarded (e.g., flushed) from the various units of processor 102.

The write-back logic 26 writes results of executing the instruction to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 102 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a CPU 110 may have multiple execution/processing/pipeline slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor. Execution/processing/pipeline slices in one or more embodiments can share functional units, e.g., execution units and register files; and in one or more embodiments can form processing super-slices.

Figure 3:
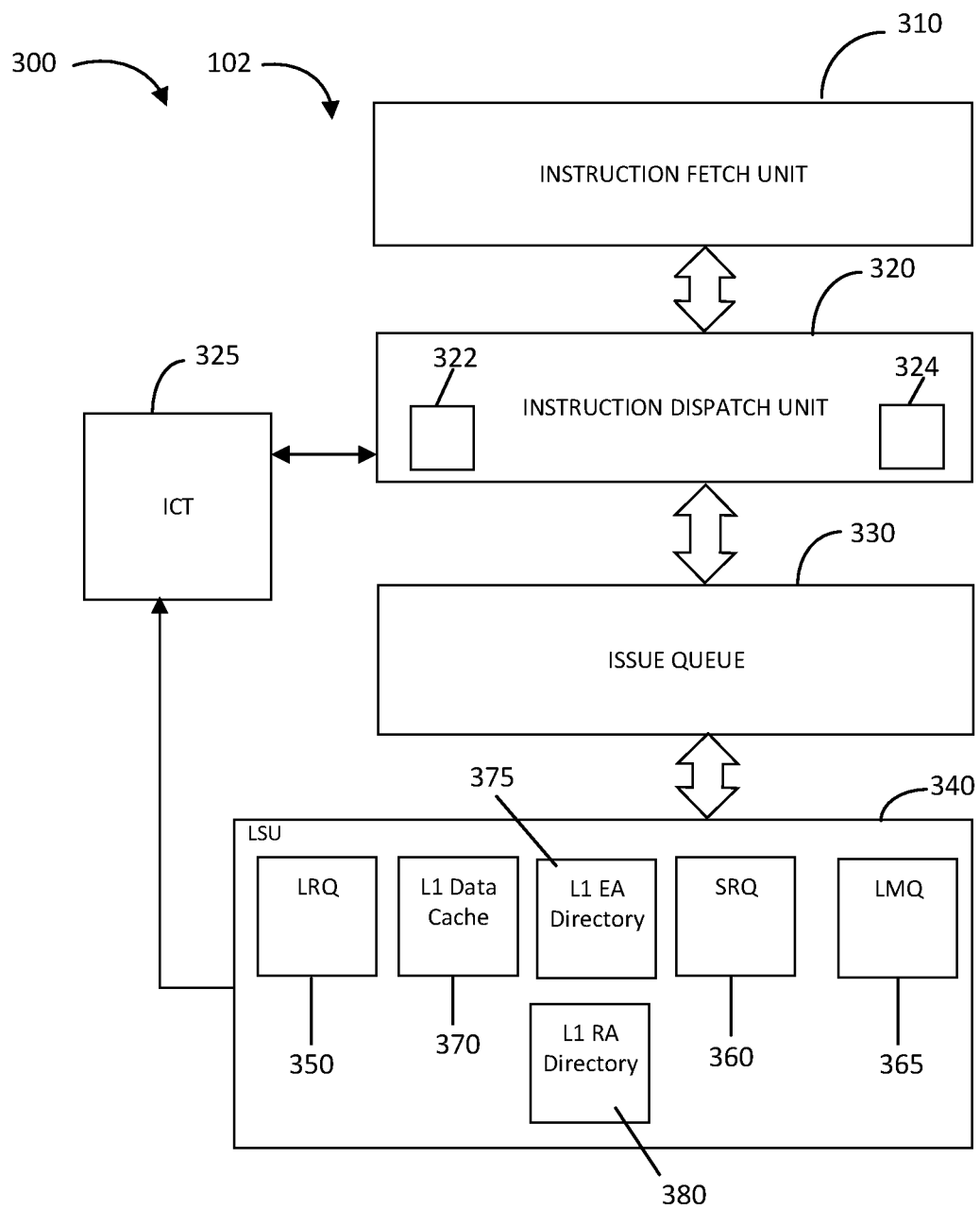
FIG. 3 illustrates a block diagram of an embodiment of a processor pipeline in accordance with an embodiment of the disclosure in which certain aspects of the present disclosure may be practiced.

FIG. 3 illustrates a block diagram of a portion of a pipeline 300 in processor 102. The pipeline 300 in FIG. 3 includes Instruction Fetch Unit 310, Instruction Dispatch Unit 320, Issue Queue (ISQ) 330, Instruction Completion Table (ICT) 325, and Load Store Unit (LSU) 340. Although not shown, pipeline 300 may also include a vector scalar execution unit (VSU), among other execution units. The LSU 340 includes in an embodiment a L1 data cache 370 to hold data for execution by the LSU 340. The LSU 340 includes one or more load reorder queues (LRQ) 350, also referred to as load queues (LRQs), that track load instructions and load data for execution by LSU 340, and one or more store reorder queues (SRQs) 360, also referred to as store queues (SRQ), that track store instructions and store data for execution by LSU 340. The LSU 340 also includes a load-miss queue (LMQ) 365 that tracks loads that miss in the L1 data cache 370.

In the embodiment of FIG. 3, the LSU 340 is shown having one load queue LRQ 350, and one store queue SRQ 360. More or less load queues 350 and/or store queues 360 can be present in LSU 340, and the load queues (LRQ) 350 and store queues (SRQ) 360 can be designed and configured to have varying amounts of entries. For example, in an embodiment, load queues (LRQ) 350 may have m entries, e.g., sixty-four (64) entries, while in an embodiment, store queues (SRQ) 360 may have n entries, e.g., forty (40) entries. The entries in the load queue (LRQ) 350 and the store queue (SRQ) 360 typically have a full real address (RA), which includes in an aspect the following three fields, the real page number (RPN) of RA(11:51), a congruence class (CC) or set of RA(52:56), and a data cacheline offset of RA(57:63).

The Instruction Fetch Unit 310 fetches instructions to be executed by the processor 102 or processor slice (processor pipeline) and sends them to the Instruction Dispatch Unit 320. The Instruction Dispatch Unit 320 dispatches instructions to the Issue Queue (ISQ) 330, typically in program order. The Issue Queue (ISQ) 330 in an embodiment will issue load instructions and store instructions to the LSU 340, and more particularly will issue load instructions to the load queue (LRQ) 350 and store instructions to the store queue (SRQ) 360 in the LSU 340. The ISQ 330 typically holds an instruction until data associated with the instruction has been retrieved and ready for use. A register file (e.g., a general purpose register (GPR), a vector scalar register (VSR), or other register (e.g., ALU)), or data cache, e.g., L1 data cache 370, may serve to store data to be used in an operation specified in an instruction dispatched to an execution slice, and the result of the operation performed by the execution units, e.g., LSU 340, may be written to the designated target register in the register file.

When data has been retrieved and placed in the register file or cache, e.g., L1 data cache 370, associated with the processor 102, the Issue Queue 330 will issue the instruction to the execution unit, e.g., LSU 340, for execution. Issue Queue 330 typically issues the instruction to the execution unit if an entry in a queue of the execution unit is available, e.g., if the store queue (SRQ) 360 or load queue (LRQ) 350 in the LSU 340 has an available entry. When data is not ready, e.g., not within the appropriate data cache or register file, delay can result as the ISQ 330 will not issue the instruction to the execution unit. For at least this reason, the Issue Queue (ISQ) typically issues instructions, e.g., load instructions and store instructions, to the execution units, e.g., LSU 340, out-of-order so instructions where the required data is available can be executed.

Dispatch Unit 320 in an embodiment will stamp, e.g., assign, each load instruction in a thread that is dispatched to the Issue Queue 330 with an identifier, e.g., a load tag (lTag). The load instructions (lTags) are typically allocated and stamped in ascending program order on a per thread basis by the Dispatch Unit 320, if an entry is available in the load queue (LRQ) 350. The instructions residing in the load queue (LRQ) 350 are referred to or identified by their load tags or lTags and/or entry numbers. The Dispatch Unit 320 in an aspect contains a per thread load instruction counter 322 that increments for each load instruction dispatched to the Issue Queue 330, up to a maximum number of load instructions have been allocated and placed into the load queue (LRQ) 350 in the LSU 340. Once the maximum number of load instructions is reached, the Dispatch Unit 320 typically stalls at the next load instruction until the load queue (LRQ) 350 has deallocated an entry. Load reorder (LRQ) entries typically are freed up (deallocated) when the load has completed (retired) and has entirely executed within the processor core.

When LSU 340 is available it will execute the load instructions in the load queue (LRQ) 350. The LSU 340 executes load instructions out-of-order and when the LSU 340 finishes a load instruction (lTag), the LSU 340 will report the finished load instruction, e.g., lTag, to Instruction Completion Table (ICT) 325. The ICT 325 completes the load instructions in order. Each entry in the ICT 325 in an embodiment has a field to indicate that an instruction is a load instruction or a store instruction. When the ICT 325 completes one or more load instructions, the ICT 325 reports to the Dispatch Unit 320 the number of ICT entries that have the load bit and are completed.

Dispatch Unit 320 in an embodiment will stamp e.g., assign, each store instruction in a thread that is dispatched to the Issue Queue 330 with an identifier, e.g., a store tag (sTag). The store instructions (sTags) typically are allocated (assigned) and stamped in ascending program order on a per thread basis by the Dispatch Unit 320, if an entry in the store queue 360 is available. The instructions residing in the store queue (SRQ) 360 are referred to or identified by their store tags or sTags or store queue entry number. Dispatch Unit 320 also contains and maintains a per thread store instruction counter 324 that increments for each store instruction (sTag) in a thread that is dispatched to the Issue Queue 330, up to a maximum number of store instructions for that thread have been allocated for or placed into the store reorder queue (SRQ) 360 in the LSU 340. Once the number of store instructions (e.g., sTags) that can fit into the SRQ 360 have been dispatched by the Instruction Dispatch Unit, the Instruction Dispatch Unit 320 typically stalls at the next store instruction until the SRQ 360 in an aspect has deallocated a store instruction entry in the SRQ 360.

When LSU 340 is available it will execute the store instructions in the store queue (SRQ) 360. The LSU 340 executes store instructions out-of-order and when the LSU 340 finishes a store instruction (stag), the LSU 340 will report the finished store instruction, e.g., stag, to Instruction Completion Table (ICT) 325. The store instruction in the store queue (SRQ) 360 in one or more embodiments is considered finished based upon various criteria, including, for example, after the LSU 340 drains the result of the store instruction (e.g., the sTag) into memory, e.g., L1 data cache 370 and/or L2 cache. Store reorder queue entries typically are freed up (deallocated) when the store instructions have executed and the stores have drained into the L1 data cache 370 (and/or the L2 data cache).

The ICT 325 contains a queue of the instructions dispatched by the Dispatch Unit 320 and tracks the progress of the instructions as they are processed. In an embodiment, the ICT 325 has a per thread completion tail pointer that keeps track of the progress of executing the instructions in the thread, e.g., a pointer that points to the next-to-complete (NTC) instruction in the thread. The ICT 325 may store and track information on the instructions processed by the processor, including, for example, the type of instruction (e.g., a store or load instruction), whether the instruction is finished, whether the instruction is ready-to-complete (RTC), and/or other information.

In a typical processor that performs out-of-order execution there usually is a load store unit in the processing core that has a load reorder queue (LRQ), a store reorder queue (SRQ), and a Data Cache and one or more associated Data Cache Directories to track out-of-order execution in the LSU. Typically, in any Instruction Set Architecture (ISA) memory reordering requirements are based upon real addresses (RAs), also referred to as a physical address. Because memory reordering requirements are real address (RA) based, load and store instructions and operations in a typical processor will upon execution go through effective address (also referred to as logical address) to real address translation. Typically, the real address (RA) of each load or store that is executed will be stored in an LRQ or SRQ entry associated with that load or store instruction, where it will be tracked to detect load/store ordering hazards while the load or store instruction is in the out-of-order execution window of the processor core's instruction sequence process.

The RA typically includes a large number of bits and tracking and translating the RA of the load and store operations in a processor, for example in a LSU, is cumbersome, and inefficient. For example, the real address (RA) in a processor can be 53 bits wide, e.g., RA(11:63), where the RA of a load or store in a processor, e.g., in a Power processor by IBM, can be broken down into three fields, the Real Page Number (RPN), congruence class (CC) or set, and L1 data cacheline offset, where the RPN=RA(11:51), congruence class (CC)=RA(52:56), and the L1 data cacheline offset=RA(57:63). Typically, for all effective addressing and real addressing, EA (52:63) is always equal to RA (52:63). Furthermore, in a typical processor, each L1 data cache entry stores a RPN (i.e., a RA(11:51) tag) associated with that cacheline for each L1 congruence class (CC) index.

Rather than store a full real address (RA) in each LRQ and SRQ entry, a data cache Way, which is representative of a RPN, can be stored in the LRQ or SRQ instead of the full RPN, thus saving bits and making tracking in a LSU, including in the LRQ and SRQ more efficient. That is, the RPN, e.g., the 41 bit RA(11:51) field can be represented in the LRQ and SRQ entry using a much smaller data cache Way field. In an example embodiment, the L1 congruence class (CC) (RA 52:56) and the L1 data cacheline offset (RA: 57:63) still needs to be tracked in the LRQ and SRQ. In an example embodiment, there are eight (8) Ways for a given congruence class (set) in the data cache, so the data cache Way is a three (3) bit field representing the eight Ways, however, other size congruence classes/sets are contemplated and other size data cache Way bit fields, e.g., a two bit Way field for four Ways in the data cache, are contemplated. In an embodiment of a LSU, a LRQ or SRQ entry address can include a bit field to identify the Way and a bit field to represent the RA(52:63) (or EA since EA(52:63) is the same as RA(52:63)), thus reducing the address width in the LRQ and SRQ. In an aspect, a load queue entry address and/or a store queue entry address is a Way field, RA(52:56) field. In the example of eight Ways being implemented in the Data Cache, the Way field is three bits (Way(0:2)). Each entry in the load queue and/or store queue stores far fewer address bits than in a typical processor, for example a processor that addresses using the width of the real address (RA). In addition, the circuitry used for detecting load and store ordering hazards associated with out-of-order execution is reduced in width by using the Way field, e.g., L1 Way(0:2), as a proxy for the RPN (RA(11:51).

Figure 4:
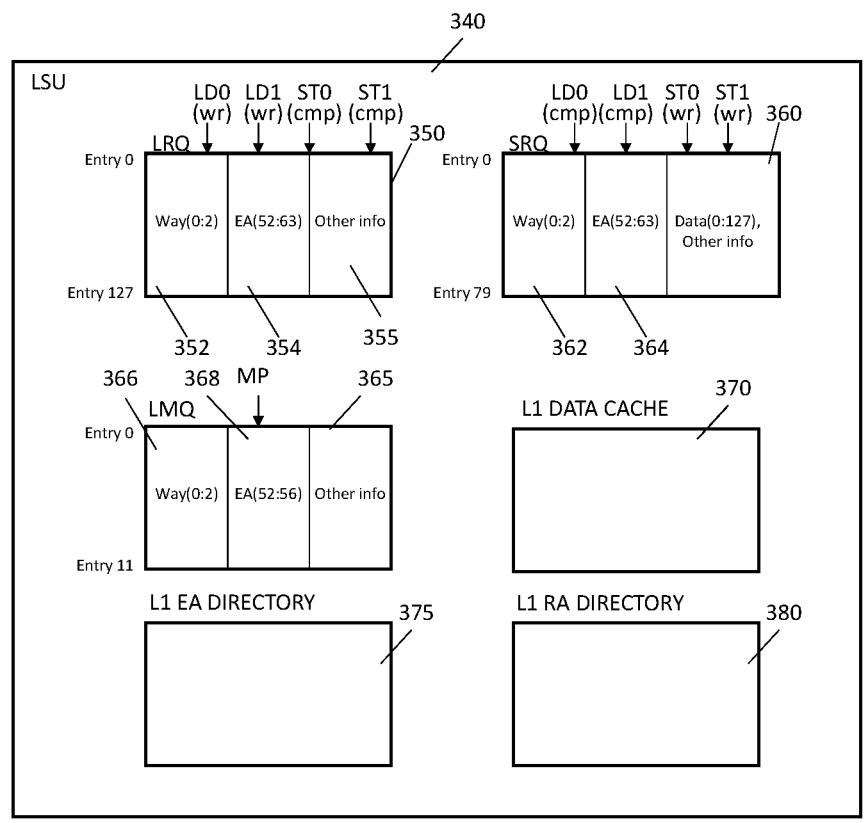
FIG. 4 illustrates a block diagram of an embodiment of a Load Store Unit (LSU) in which aspects of the present disclosure can be practiced.

FIG. 4 shows a block diagram of a Load Store Unit (LSU) 340 in accordance with an embodiment in which the present disclosure can be practiced. LSU 340 in FIG. 4 includes a load queue (LRQ) 350, a store queue (SRQ) 360, a Load-Miss queue (LMQ) 365, a L1 Data Cache 370, a L1 Effective Address (EA) data cache directory 375 (also referred to as a L1 EA Directory 375), and a L1 Real Address (RA) data cache directory 380 (also referred to as a L1 RA Directory 380). As shown in FIG. 4, for address tracking, load queue 350 has an entry address represented by a L1 Way(0:2) field 352 representing the RPN, and an EA (52:63) field 354 that includes the L1 congruence class (CC) (RA (52:56)) and the L1 data cacheline offset (RA(57:63)). Load queue 350 includes other fields of information as well, and can include a deprecated or reallocation bit field 355, as discussed below. Similarly, for address tracking, store queue 360 has an entry address represented by a L1 Way(0:2) field 362 representing the RPN, and an EA (52:63) field 364 that includes the L1 congruence class (CC) (RA (52:56)) and L1 data cacheline offset (RA(57:63)). The store queue (SRQ) 360 in an aspect includes a data field and other information. Load-Miss queue (LMQ) 365 tracks loads that miss the L1 Data Cache 370 and in such cases sends a request for the data to the L2 Data Cache. For address tracking, the LMQ 365 has an entry address represented by a L1 Way(0:2) field 366 representing the RPN, and an EA (52:63) field 368 including the congruence class (CC) (RA(52:56)) and L1 Data cacheline offset (RA(57:63)). Instead of using the RPN (field containing RA(11:51)), the load queue 350, the store queue 360, and the load-miss queue 365 can use the data cache Way to represent the RPN. An entry address in the load queue (LRQ) 350, the store queue (SRQ) 360, and the load-miss queue (LMQ) 365 uses a Way field, e.g., L1 Way(0:2), and RA(52:63)/EA(52:63).

The load queue (LRQ) 350 shown in FIG. 4 has 128 entries, the store queue (SRQ) 360 has 80 entries, and the load miss queue (LMQ) 365 has 12 entries. More or less entries can be used for one or more of the load queue (LRQ) 350, the store queue (SRQ) 360, and/or the load-miss queue (LMQ) 365.

Figure 5:
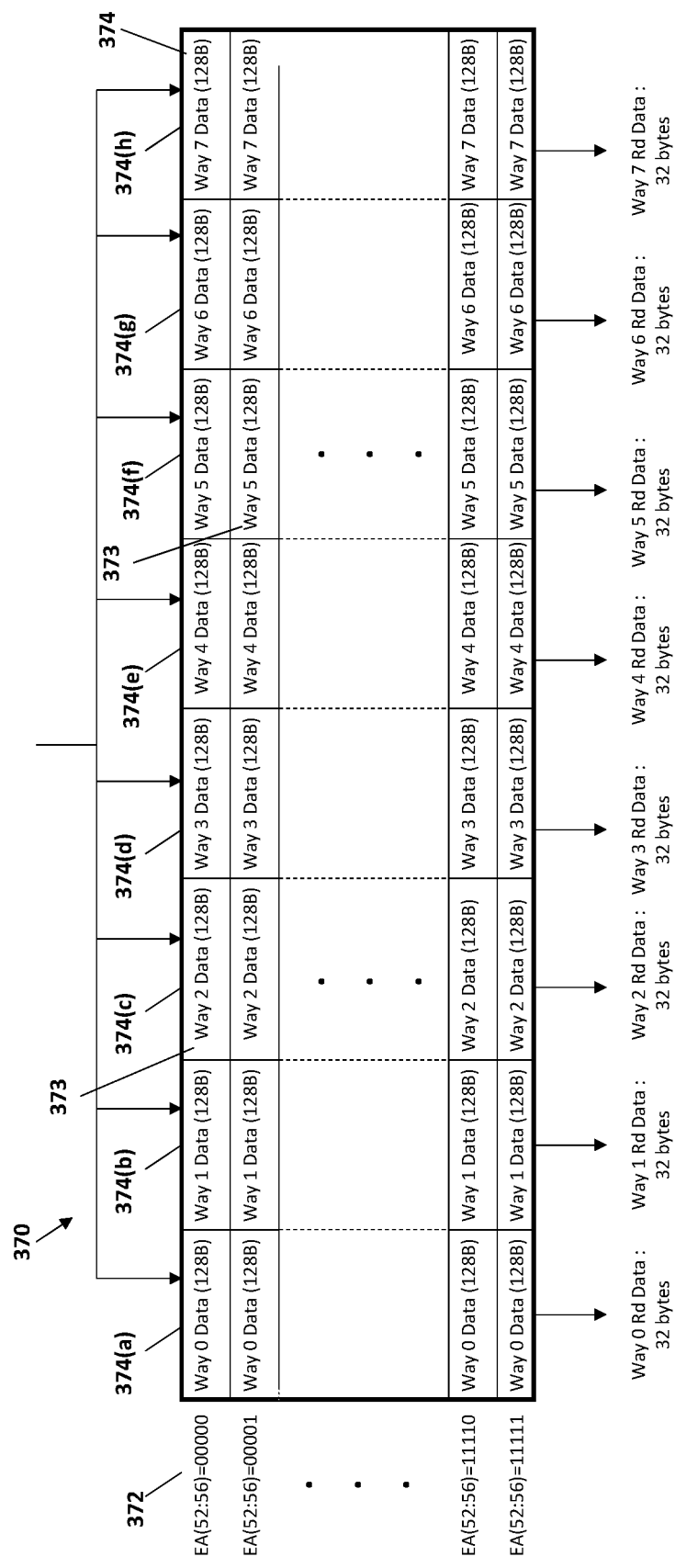
FIG. 5 illustrates a diagram of an embodiment of a Data Cache in which aspects of the present disclosure can be practiced.
Figure 6:
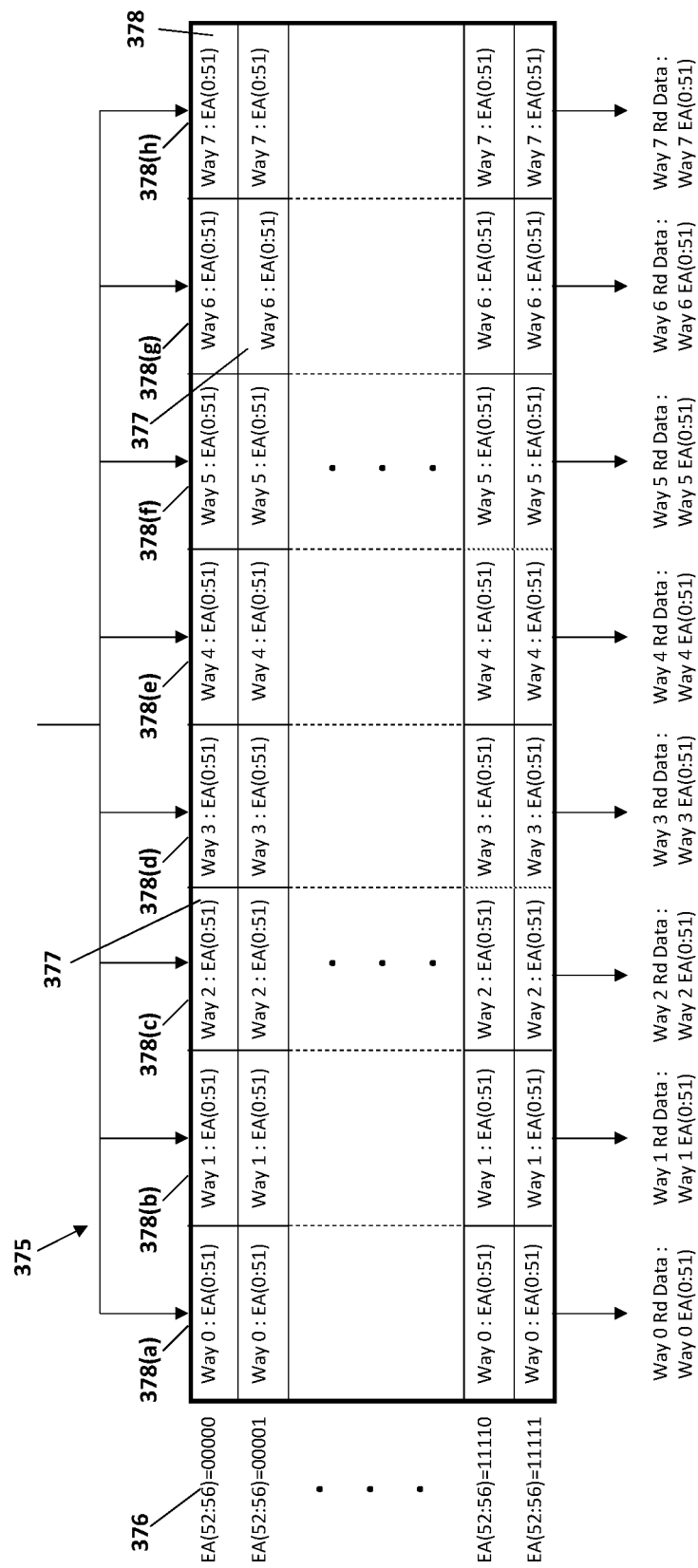
FIG. 6 illustrates a diagram of an embodiment of an Effective Address (EA) Directory for a Data Cache in which aspects of the present disclosure can be practiced.
Figure 7:
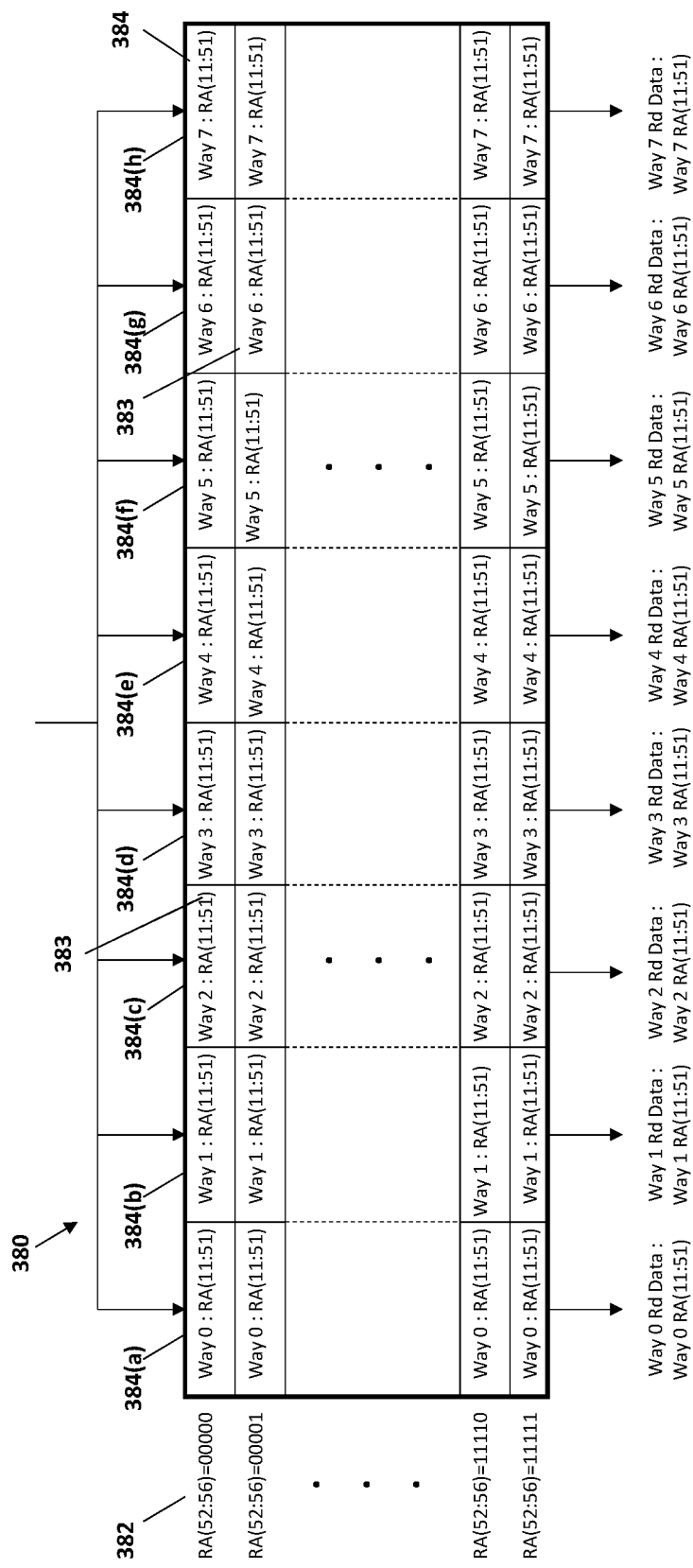
FIG. 7 illustrates a diagram of an embodiment of a Real Address (RA) Directory for a Data Cache in which aspects of the present disclosure can be practiced

FIG. 4 also shows a simple block diagram of the L1 Data Cache 370, the L1 EA Directory 375, and the L1 RA Directory 380. A more detailed diagram of an embodiment of the L1 Data Cache 370 is shown in FIG. 5, a more detailed diagram of an embodiment of the L1 EA Directory 375 is shown in FIG. 6, and a more detailed diagram of an embodiment of the L1 RA Directory 380 is shown in FIG. 7. The L1 EA Directory 375 is a directory of the effective addresses (EAs) held in the L1 data Cache 370 while the L1 RA Directory 380 is a directory of the real addresses (RAs) held in the L1 Data Cache 370. Each of the L1 Data Cache 370, the L1 EA Directory 375 and the L1 RA Directory 380 are organized the same using the congruence class (CC) or set.

As shown by FIG. 5, which shows an embodiment of L1 Data Cache 370 in which the current disclosure can be practiced, the L1 Data Cache 370 holds data and is primarily addressed by the congruence class (CC) (or set) bits of the effective address (EA), that being EA(52:56). Each row 372 in the L1 Data Cache 370 represents an EA(52:56). The L1 Data Cache 370 is further sub-organized by Ways 374. That is, each row 372 as shown in FIG. 5 has an EA(52:56) and a number of Ways 374. In an embodiment, each row 372 in the in the L1 Data Cache 370 has eight Ways 374 represented by eight columns, e.g., Way 0 through Way 7 (374(a)-374(h)). Each entry 373 in the L1 Data Cache 370 stores 128 Bytes of data and is represented by a unique EA(52:56) and Way 374. That is, each entry 373 in the L1 Data Cache 370 is addressed by a row 372 having an EA(52:56) and a Way field 374, and contains 128 Bytes of data. The data from the L2 Cache or other memory is written into an entry 373 in the Data Cache 370 defined by address EA(52:56) and the Way field 374. For example, the data and address defined by EA(52:56) and Way(0:2) where the data will reside is written into Data Cache 370 on a L2 Reload.

The L1 EA Directory 375 as shown in FIG. 6 is organized and arranged in the same manner as the Data Cache 370. That is the organization of the L1 EA Directory 375 is the same as and matches the organization of the L1 Data Cache 370 so that an entry 373 in the Data Cache correlates with the same entry 377 in the L1 EA Directory 375. The L1 EA Directory 375 is primarily addressed by the congruence class (CC) (or set) bits of the effective address (EA), that being EA(52:56). Each row 376 in the L1 EA Directory 375 represents an EA(52:56). The L1 EA Directory 375 is further sub-organized by Ways 378. That is, each row 376 of the L1 EA Directory 375 as shown in FIG. 6 has an EA (52:56) and a number of Ways 378. In the embodiment of FIG. 6, each row 376 in the L1 EA Directory 375 has eight Ways 378 the same as the L1 Data Cache 370. The eight Ways 378 in the L1 EA Directory 375 are represented by eight columns, e.g., Way 0 through Way 7 (378(a)-378(h)). So when a specific congruence class (CC) is accessed, there are eight (8) Ways 374 that are read out of the L1 EA Directory 375. Each Way 378 has a unique EA(0:51) associated with it. Each entry 377 in the L1 EA Directory 375 contains EA(0:51) and is represented by a unique EA(52:56) and Way 378. That is, each entry 377 in the L1 EA Directory 375 is addressed by a row 376 having an EA(52:56) and a Way field 378, and contains EA(0:51). Another way of considering the organization of the L1 EA Directory 375 is that eight (8) different addresses with the same EA(52:56) can simultaneously be stored in eight Ways 374, each Way containing unique EA(0:51) values. EA(0:51) from the Miss Pipe (explained below) is written into an entry 377 in the EA Directory 375 defined by address EA(52:56) and the Way field 378. That is, the address defined by EA(52:56) and Way(0:2) is where EA(0:51) will be written into the EA Directory 375 from the Miss Pipe.

When a load or store instruction is issued to the LSU 340, the EA (52:56) of the load or store is used to access the Ways, e.g., the eight Ways 374, of the L1 Data Cache 370, each containing a different EA(0:51). In operation, the EA(52:56) of the load or store instruction is sent to the L1 EA Directory 375 and if any of the rows 376 match the EA(52:56) of the load or store instruction, and if any of the Ways 378 has an EA(0:51) that matches the EA(0:51) of the load or store instruction, then that load or store is considered to have hit in the L1 EA Directory 375 on the particular congruence class (CC), also known as set, and Way. For example, for a hit on EA(52:56), the L1 EA Directory 375 will read out EA(0:51) for each Way(0:2) 378 contained in the row 376 hit on in the EA Directory 375. The actual entry 377 hit on in the L1 EA Directory 375 identifies the corresponding entry 373 in the L1 Data Cache 370 that has the desired data for the particular load or store instruction as explained in more detail below. That is the data in Way "n" of the L1 Data Cache 370 corresponds to and is the data at the effective address (EA) in Way "n" of the L1 EA Directory 375. The Way field information will be used by the load queue (LRQ) 350 and the store queue (SRQ) 360 to track the load and store instructions in the LSU 340.

The L1 RA Directory 380 as shown in FIG. 7 is organized and arranged in the same manner as the Data Cache 370 and the L1 EA Directory 375. The L1 RA Directory 380 is used for loads or stores that go to the Miss Pipe shown in FIG. 8 and have effective address (EA) to real address (RA) translation performed by an ERAT or other translation mechanism/technique. The L1 RA Directory 380 is primarily addressed by the congruence class (CC) (or set) bits of the real address (RA), that being RA(52:56). Since for all effective and real addressing EA (52:63) is always equal to RA(52:56), RA(52:56) is the same as EA(52:56) supplied by the load or store instruction. Each row 382 in the L1 RA Directory 380 represents an RA(52:56). The L1 RA Directory 380 is further sub-organized by Ways 384. That is, each row 382 of the L1 RA Directory 380 as shown in FIG. 7 has an RA(52:56) and a number of Ways 384. In the embodiment of FIG. 7, each row 382 in the L1 RA Directory 380 has eight Ways 384, the same as the L1 Data Cache 370 and the L1 EA Directory 375. The eight Ways 384 in the L1 RA Directory 380 are represented by eight columns, e.g., Way 0 through Way 7 (384(a)-384(h)). Each Way 384 has a unique RA(11:51) value associated with it. Each entry 383 in the L1 RA Directory 380 stores RA(11:51) values and is represented by a unique RA(52:56) and Way 384. That is, each entry 383 in the L1 RA Directory 380 is addressed by a row 382 having an RA(52:56) and a Way field 384, and contains RA(11:51). RA(11:51) from the Miss Pipe (explained below) is written into an entry 383 in the RA Directory 380 defined by address RA(52:56) and the Way field 384. That is, the address defined by RA(52:56) and Way(0:2) is where RA(11:51) will be written into the RA Directory 380 from the Miss Pipe. The RA in Way "n" of the L1 RA Directory 380 is the translated real address of the EA in Way "n" of the L1 EA Directory 375. In operation, when there is a hit on a row 382 in RA Directory 380, RA(0:51) will be read out of each Way 384 in the RA Directory 380 as explained in more detail below.

Figure 8:
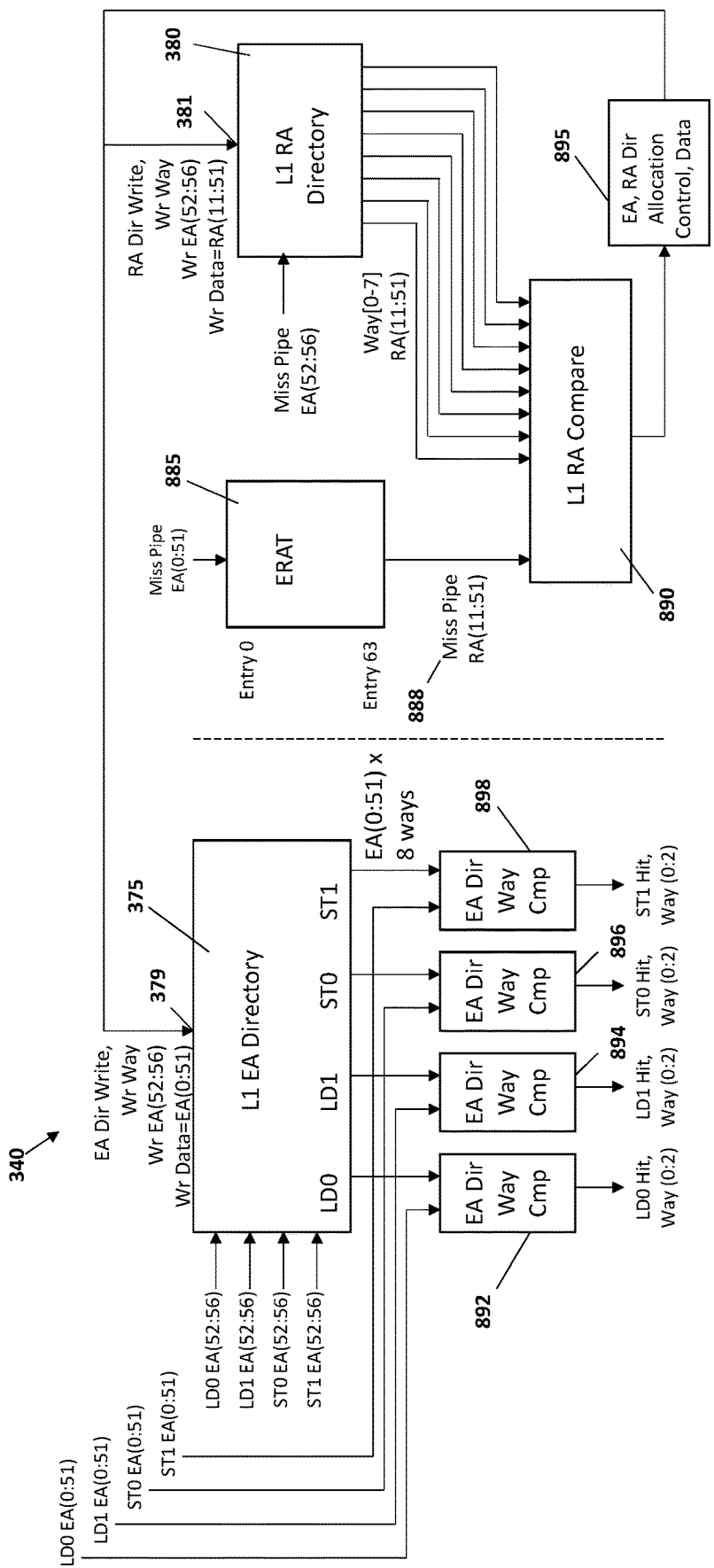
FIG. 8 illustrates a block diagram of an embodiment of a pipeline for address tracking in a load-store unit (LSU) in which aspects of the present disclosure can be practiced.

FIG. 8 is a block diagram of the interaction between the L1 EA Directory 375 and the L1 RA Directory 380 upon processing a store or load instruction in an LSU 340. When a load or store instruction is issued to the LSU 340 the EA of the load or store instruction goes to the L1 EA Directory 375 to determine if the data is in the L1 Data Cache 370 (not shown in FIG. 8). More specifically, EA(52:56) is feed into L1 EA Directory 375 and if EA(52:56) hits in the L1 EA Directory 375, each EA(0:51) stored in the eight (8) Ways 378(a)-378(h) of the L1 EA Directory row 376 that has EA(52:56) that matches the EA(52:56) of the load or store instruction are read out of the L1 EA Directory 375. The eight Ways 378(a)-378(h) read out of the L1 EA Directory 375 are sent to the corresponding EA Directory Way Comparison 892, 894, 896, 898 for the corresponding load or store instruction. For example, if LSU 340 was processing a Load Instruction (LDO) on slice 0, EA(0:51) in each of the eight Ways 378(a)-378(h) for the matching EA(52:56) are sent from the L1 EA Directory 375 to EA Directory Way Comparison 892. A comparison of the EA(0:51) values from each of the eight Ways 378(a)-378(h) sent from the L1 EA Directory 375 to the EA(0:51) of the load or store instruction is performed in the corresponding EA Directory Way Comparison 892, 894, 896, 898. If there is a match in the L1 EA Directory Way Comparison, then there is a hit in the L1 EA Directory 375, and the Way 378 (corresponding to and serving as a proxy of the RPN) that has the EA(0:51) that matched the EA(0:51) of the load or store instruction is identified and/or provided. The Way 374 (or entry 373) in the L1 Data Cache 370 corresponding to the Way 378 (or entry 377) in the L1 EA Directory 375 has the desired data for the load or store instruction. Most load and store instructions will hit in the EA Directory 375 and have an associated entry 373 in the Data Cache 370. The data cache Way field (e.g., Way(0:2) hit on for a given load or store instruction, since it is representative of an RPN, can then be stored in the load queue (LRQ) 350 or the store queue (SRQ) 360, in an aspect without storing the RPN, e.g., (RA(11:51).

If the load or store instruction misses in the L1 EA Directory 375 indicating that the L1 Data Cache 370 does not contain the data for the load or store instruction, then the EA of the load or store is sent to the Miss Pipe where the EA(0:51) of the instruction is sent to ERAT 885. ERAT 885 is an Effective Address (EA) to Real Address (RA) table which is used to translate an effective address (EA) to a real address (RA). EA(0:51) of the load or store instruction that missed in the L1 Data Cache 370 is sent to the ERAT 885 and retrieves RA(11:51) and sends RA(11:51) 888 to L1 RA Compare 890. While ERAT 885 has been illustrated to provide a translation of the effective address to a real address to provide RA(11:51) representative of the real page number (RPN), it can be appreciated that other mechanisms and/or techniques can be implemented to obtain the translation, provide RA(11:51), and/or provide the real page number (RPN).

EA(52:56) of the load or store sent to the Miss Pipe is sent to the L1 RA Directory 380. EA(52:56) is always equal to RA(52:56) so the L1 RA Directory 380 is searched to see if there is a matching RA(52:56), and if there is a matching RA(52:56), then the eight Ways 384(a)-384(h) are read out of the L1 RA Directory 380, where each Way 384 has a unique RA(11:51) value. The eight RA(11:51) values from the eight Ways 384(a)-384(h) of the L1 RA Directory 380 are sent to the L1 RA Compare 890. A comparison is performed in the RA compare 890 between RA(11:51) sent by ERAT 885 and the eight RA(11:51) values sent from the eights Ways 384 of the L1 RA Directory 380. The comparison in RA Compare 890 is performed to avoid allocating the same RA(11:51) to two different Ways which would violate the rule that the same RA should not exist in two different Ways. If there is a match in L1 RA Compare 890 between the RA(11:51) 888 sent from ERAT 885 and one of the RA(11:51) values output from one of the eight Ways 384 sent by L1 RA Directory 380, then the load or store operation will not allocate a new Way in the EA Directory 375 or RA Directory 380. For example, the load or store operation could be assigned the Way of an existing Way that was allocated on a previous, adjacent load or store instruction.

If the load or store misses in the L1 RA Directory 380, the EA, RA Directory Allocation Control 895 allocates an entry 373 in the L1 Data Cache 380 addressed by L1 Way field 374 and RA(52:56) (same as EA(52:56)), and allocates the same corresponding entry/location 383 in the L1 RA Directory 380 represented by Way 384 and RA(52:56), and allocates the same corresponding entry 377 in the L1 EA Directory 375 addressed by Way 378 and EA(52:56). In this manner EA, RA Directory Allocation Control 895 allocates the same entry/Way in the Data Cache 370, the EA Directory 375, and the RA Directory 380. The L1 EA Directory 375 and the L1 RA Directory 380 are written where a new set "x" (congruence class x) and Way "y" are allocated and have new EA and RA values written into the appropriate respective corresponding entry 377 in the L1 EA Directory 375 and entry 383 in the L1 RA Directory 380. RA(52:56), which represents the congruence class (CC), is written at 381 into the row 382 of the L1 RA Directory 380 and RA(11:51) is written at 381 into the appropriate Way 384 in the L1 RA Directory 380. That is, the RA(11:51) value is written into the appropriate entry 383 defined by the RA(52:56) congruence set and the Way field 384. EA(52:56), which represents the congruence class (CC), is written at 379 into the row 376 of the L1 EA Directory 375 and EA(0:51) is written at 379 into the appropriate Way 378 in the L1 EA Directory 375. That is, the EA(0:51) value is written into the appropriate entry 377 defined by the EA(52:56) congruence set (row 376) and the Way field 378. The data cache Way field (e.g., Way(0:2)) that was allocated for the given store or load instruction, since it is representative of a real page number (RPN), can then be stored in the load queue (LRQ) 350 or the store queue (SRQ) 360, in an aspect without storing the RPN, e.g., (RA(11:51).

In one or more embodiments, rather than store a full real address in each load queue (LRQ) and store queue (SRQ) entry, the load and store instruction will allocate an L1 data cache entry addressed by Way and RA (52:63). The L1 Data Cache Way 374 either allocated or hit on for a given load or store instruction can be stored in the load queue (LRQ) 350 or store queue (SRQ) 360 instead of the full RPN, RA(11: 51). By using a smaller Way field as a proxy for the RPN (RA(11:51)) less address bits are used in the load queue (LRQ) 350 and store queue (SRQ) 360 to track load and store instructions in the LSU 340. In an embodiment, the technique of addressing the Data Cache, the EA Directory, and the RA Directory by Way field and congruence class (EA(52:56)), results in less address bits being used to track load and store instructions.

In one or more embodiments, for store instructions, an L1 data cache Way 374 (or entry 373) will be locked and prevented from reallocating for any store in the SRQ that was assigned that data cache Way upon execution. This data cache Way locking technique has the advantage or being able to read out the full real address RA(11:51) from the L1 RA Directory 380 when sending the store instruction to the next level of cache (e.g., the L2). That is, the RA(11:51) held in the Data Cache Way 374 and/or entry 373 is valid since the Way/entry has not been reallocated to a new store instruction.

For load instructions, if the L1 Data Cache 370 chooses to reallocate a Data Cache Way 374 (or entry 373) that is currently in use by a load queue (LRQ) entry, the reallocation can proceed (the Way 374/entry 373 is not locked by a load instruction). The LRQ entry will be marked as "reallocated" or "deprecated" by storing an additional reallocation/deprecated bit per LRQ entry. For example, a reallocation/deprecated bit 355 can be included in an entry of the LRQ 350 as shown in FIG. 4. If an LRQ entry is marked as reallocated or deprecated, it will detect ordering hazards more pessimistically in the LRQ 350 as an address match in ordering hazard logic will be based on just matching RA(52: 63) of the load instruction since the Way field in a reallocated/deprecated LRQ entry will no longer truly be representative of the RA(11:51) of the load instruction. However, having a reallocated/deprecated LRQ entry is relatively infrequent due to L1 data cache Ways 374 typically having a much longer lifetime than an LRQ entry. This reallocation/ deprecation technique is advantageous for handling reallocation of Ways used by LRQ entries, especially in smaller sized data caches since the number of load instructions in an LRQ out-of-order window is typically very large in many workloads, much larger than the typical number of stores, and preventing Data Cache allocation to Ways that a load instruction is using could be too prohibitive and therefore, detrimental to performance.

In one or more embodiments a unique hybrid reallocation of load and store queue entries is disclosed where two different reallocation interlock techniques are implemented, one technique for the load queue (LRQ) and a different technique for the store queue (SRQ). In an embodiment, reallocation of load queue entries and store queue entries can be implemented where:

(1) Ways (and/or entries) in the data cache used by the store queue (SRQ) to track store instructions can be locked to allow store instructions to always be able to read a valid RA from the L1 Data Cache Directory, while taking advantage of the relatively small penalty of locking store queue (SRQ) Ways due to store instructions because the number of store instructions tracked by the store queue (SRQ) in the out-of-order window is typically small compared to the number of load instructions.

(2) Deprecating load instructions upon reallocation to take advantage that load instructions typically have a short lifetime in the load queue (LRQ) that will not often be assigned L1 Ways that are about to be reallocated. And if the number of load instructions is large in the out-of-order window, that it is better to not lock all Data Cache Ways in use by the LRQ but deprecate the load instead if its L1 way is reallocated.

The tracking of RA(11:51) in the load queues and store queues based upon data cache Ways in combination in one or more embodiments with the different techniques of reallocating (e.g., locking and non-locking) of data cache Ways for load and store instructions provides enhanced efficiency to processors, and tracking and executing load and store instructions, for example in a Load Store Unit.

While the techniques, mechanisms, systems, units, circuitry, and components have been described in connection with a level 1 (L1) data cache, it can be appreciated that the techniques, mechanisms, systems, units, circuitry, and components can have application to other levels of data cache management and processing.

Figure 9:
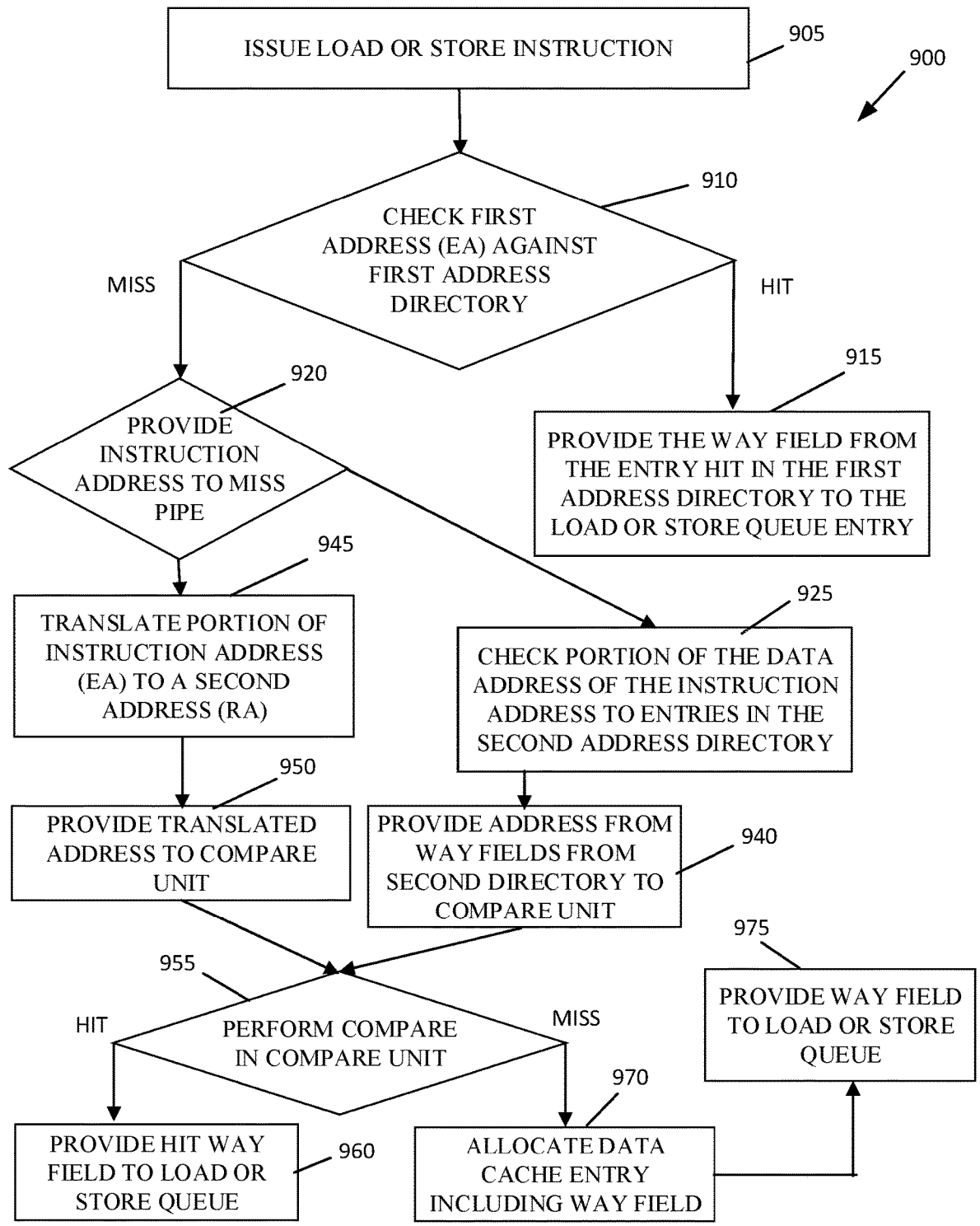
FIG. 9 illustrates a flow chart of a method of allocating and tracking load and store addresses in a processor according to an embodiment in which aspects of the present disclosure can be practiced.

FIG. 9 is an exemplary flowchart in accordance with an embodiment illustrating and describing a method 900 of handling instructions in an information handling system, and in an embodiment a method of tracking load and store operations in a processor. In an aspect, method 900 allocates or assigns a proxy for an address in memory, in an aspect a Way that acts as a proxy for an address in memory, that uses less bits than the address in memory, e.g., less bits than the effective address (EA), the real address (RA), or the real page number (RPN). While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

Method 900 of tracking load and store operations in a processor, including allocating a proxy for an address in memory, e.g., a Way, used in load queues (LRQ) and store queues (SRQ) in a load store unit (LSU) is shown in FIG. 9. At 905 a load or store instruction is issued, preferably to a load store unit. In one or more embodiments, if a load instruction issued it is stored in a load queue (LRQ) for tracking load instructions and if a store instruction issued it is stored in a store queue (SRQ) for tracking store instructions. The address, e.g. the effective address (EA) or logical address, of the load or store instruction at 910 is checked against entries in a first Address Directory, e.g., an Effective Address (EA) Directory. The Address Directory, e.g., the EA Directory, in one or more embodiments holds the addresses, e.g., the effective addresses (EAs), in entries that correspond to the data held in entries in a Data Cache. In one or more embodiments, the Data Cache and Address Directory (e.g., the EA Directory) are organized and arranged so an entry is addressed by a Way bit field defining a number of Ways and a congruence class or set, where in an aspect the congruence set is arranged as rows and the Way fields are arranged in columns. In one or more embodiments, at 910 a portion of the EA field from the load or store instruction is checked against a corresponding portion of the EA fields in the EA directory, and if the EA fields match, i.e., there is a hit, then a plurality of effective addresses (EA(0:51)) contained in the plurality of Ways are read out. The EA field read from the EA Directory Ways in an aspect is compared, for example in an EA Directory Way Compare, to the corresponding EA field of the load or store instruction, and if there is a match, i.e., there is a hit in the EA Directory (910: Hit), then at 915 the Way field from the entry hit in the Address Directory, e.g., the EA Directory, is provided to and stored in the load queue (LRQ) or store queue (SRQ) and associated with the congruence class and data cacheline offset (EA(52:63)) to track the respective load or store instruction.

If at 910 the address, e.g., the effective address, of the load or store instruction does not hit in the Address Directory, e.g., the EA Directory, but rather misses in the Address Directory (910: Miss), then the process continue to 920 where the address, e.g., the effective address, of the load or store instruction is provided or supplied to the Miss Pipe. In the Miss Pipe, a portion of the address, e.g., a portion of the effective address, of the load or store instruction is checked at 925 against entries in a second Address Directory, e.g., the RA Directory. In one or more embodiments, the second Address Directory, e.g., the RA Directory, is organized and arranged in the same manner as and corresponds to the first Address Directory, e.g., the EA Directory. In an embodiment, the RA Directory includes a plurality of Ways, and in an aspect the plurality of Ways contain real addresses, e.g., real page number (RPN) addresses.

At 940 the address, e.g., the real address (RA(11:51)), in each of the Ways corresponding to the congruence class or set (RA(52:56)) in the second Address Directory, e.g., the RA Directory, are read out and provided to a Compare Unit. Meanwhile, in the Miss Pipe, at 945 a portion of the address, e.g., the effective address EA(0:51), from the load or store instruction that is provided to the Miss Pipe, is translated to a another address (e.g., RA(11:51)) and the translated address (e.g., RA(11:51)) at 950 is also provided to the Compare Unit. At 955 the address translated in the Miss Pipe (e.g., RA(11:51)), and the address (RA(11:51)) from the entry/Way from the second Address Directory, is compared in the Compare Unit. If at 955 there is a match between the two addresses (e.g., the two RAs) delivered to the Compare Unit (955: Hit), then at 960 the Way field hit on in the Compare Unit is supplied or provided to the load or store queue. If there is not a match in the Compare Unit between the two addresses (RAs) delivered to the Compare Unit (955: Miss), then at 970, a Data Cache entry with associated Way field is allocated (including allocating first Address Directory entry/Way and second Address Directory entry/Way). The process 900 continues to 975 where the Way allocated in the Data Cache (and the corresponding Directories) is supplied to the load queue (LRQ) or the store queue (SRQ). In an aspect the Way (e.g., Way field) provided to the load queue (LRQ) or store queue (SRQ) is used to track the load or store instruction, and in an embodiment is associated with the congruence class and data cacheline offset (EA(52:63)).

In an aspect, process 900 discloses a technique and system for assigning and allocating a Way field which acts as a proxy for an address, and in an embodiment a proxy for a real page number (RPN), that decreases the bit field used to track load and store instructions. The Way field is a plurality of bits wide, generally less than ten bits, more preferably less than five bits, and in an embodiment three bits wide, e.g., Way(0:2), and accordingly is significantly less than the 41 bit address, e.g., real page number (RPN), for which it acts as a proxy.

Figure 10:
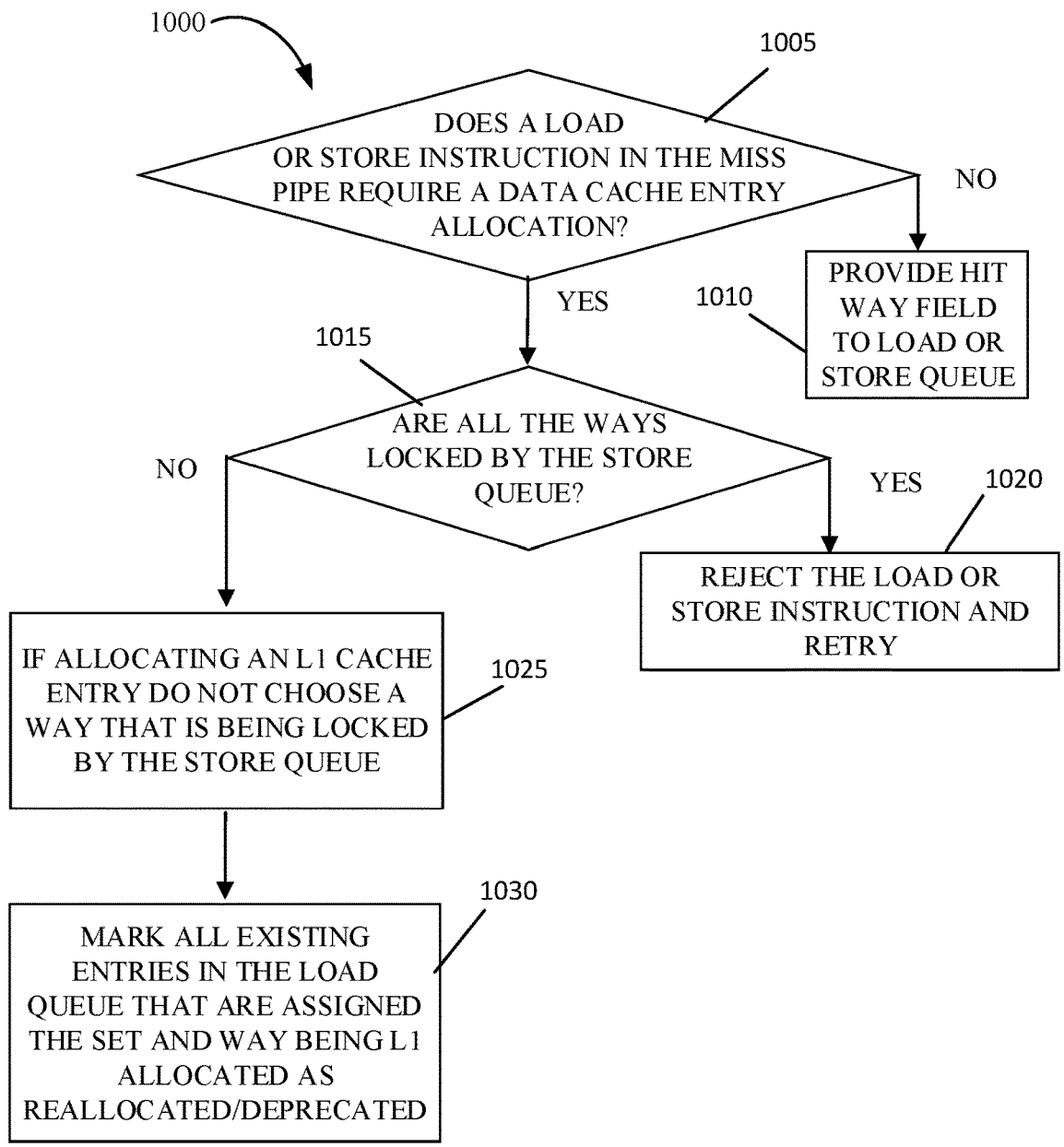
FIG. 10 illustrates a flow chart of a method of allocating and reallocating load and store queues in a load-store unit (LSU) of a processor.

FIG. 10 is an exemplary flowchart in accordance with an embodiment illustrating and describing a method 1000 of handling instructions in an information handling system, and more specifically a method of allocating and reallocating Data Cache Ways and/or Entries in a Data Cache, including respective Address Directories, and/or in load and store queues. While method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

Method 1000 of tracking load and store operations in a processor, including allocating or reallocating a data cache Way and/or load and store queue entries is shown in FIG. 10. A load or store instruction has issued and is being processed, preferably by a load-store unit (LSU), and has missed in the data cache, e.g., the L1 data cache. At 1005 it is determined whether a load or store instruction in the Miss Pipe requires a data cache entry allocation, e.g. a L1 data cache entry allocation. If the load or store instruction in the Miss Pipe does not need a data cache allocation (1005: No), then at 1010 the hit Way field is provided or supplied to the load or store queue. If it is determined that a load instruction or a store instruction in the Miss Pipe requires a data cache entry allocation (1005: Yes), then the process proceeds to 1015 where it is determined whether all the Ways are locked by a store queue. The processor, the load-store unit (LSU), and/or data cache in one or more embodiments is configured, configurable, and/or programmable to lock the data cache Ways corresponding to store instructions. In one or more embodiments, the locking of the data cache Ways can be performed when the store instruction data is written into the data cache, when an entry or Way is allocated or assigned in the data cache and/or store queue, and/or any other time during the processing and handling of the previous or current store instruction associated with the data cache Way. If at 1015, it is determined that all the Ways are locked (1015: Yes), then at 1020 the load or store instruction is rejected, and the process is retried. For example, 1015 can be reprocessed to see if all the Ways are locked. If at 1015 it is determined that not all the Ways are locked (1015: No), then the process or technique 1000 continues to 1025 where a Way in the data cache is chosen that was not locked, for example by the store queue. That is, if allocating a L1 data cache entry, do not choose a Way that is locked by the store queue. The process continues to 1030 where all existing entries in the load queue that are assigned the set (e.g., row or congruence class) and Way being allocated, e.g., allocated to the L1 data cache, as reallocated or deprecated.

While the method 1000 of FIG. 10 uses a hybrid locking reallocation technique where the store queue entries and corresponding Ways are treated and handled differently than the load queue entries and corresponding Ways. In method 1000, the store queue entry (and corresponding Ways) are locked so they cannot be reallocated and the load queues are permitted to be reused, but it is contemplated that both the load queue and store queue entries and corresponding Ways could be locked and prevented from use or both the load and store queue entries and corresponding Ways could be permitted to be reallocated. In addition, it is further contemplated that the load queue entries and corresponding Ways could be locked while the store queue entries and corresponding Ways could be permitted to be reallocated. Moreover, while the load queue entries and corresponding Ways and/or the store queue entries and corresponding could be permitted to be reallocated, the reallocation of the load queue entries and store queue entries (and corresponding Ways, e.g., data cache Ways) could be permissive and not mandatory. That is, the load queue and/or store queue entry (and corresponding Ways) do not have to be reallocated. Furthermore, the reallocation of the load queue and or store queue entry (and corresponding Ways) could be based upon a number of factors that could be programmable and/or dynamically change with the conditions of the processor, the load store unit, the data cache, and/or the load and store queues. Other factors including the design and architecture of the processor, load store unit, data cache, and/or the load and store queues, could also be used to determine whether or not to lock or reallocate data cache Ways (and corresponding load queue and/or store queue entries).

While the illustrative embodiments described above are preferably implemented in hardware, such as in units and circuitry of a processor, various aspects of the illustrative embodiments may be implemented in software as well. For example, it will be understood that one or more of the blocks of the flowchart illustration in FIGS. 9-10, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing information, the computer system comprising:
   at least one computer processor comprising:
   a load store execution unit (LSU) for processing load and store instructions, wherein the LSU comprises:
   a data cache for storing data for use by the LSU, the data cache having a plurality of entries to store the data, each data cache entry addressed by a row representing a first portion of a first address type and a Way identified by a Way bit field, each data cache row having a plurality of the data cache Ways;
   a first Address Directory to store a plurality of second portions of the first address type corresponding to the data stored in the data cache, the first Address Directory having a plurality of entries equal in number to the plurality of data cache entries, each first Address Directory entry addressed by a row and a Way where each row has a plurality of Ways, the first Address Directory having a plurality of rows and a plurality of Ways equal in number to the plurality of data cache rows and the plurality of data cache Ways, each Way in the first Address Directory corresponding to a data cache Way, identified by the Way bit field, and containing the second portion of the first address type corresponding to and identifying a location in memory where the data stored in the corresponding data cache entry is located;
   a store reorder queue for tracking the store instructions in the LSU, the store reorder queue having a plurality of entries for storing information for tracking the store instructions, each store reorder queue entry having a Way bit field for identifying at least one of the group consisting of a data cache Way, a first Address Directory Way, and combinations thereof; and
   a load reorder queue for tracking load instructions in the LSU, the load reorder queue having a plurality of entries for storing information to track the load instruction, each load reorder queue entry have a Way bit field for identifying at least one of the group consisting of a data cache Way, a first Address Directory Way, and combinations thereof.

2. The computer system of claim 1, wherein the processor is configured to:
   determine whether at least a second portion of an address of the load or store instruction matches one of the plurality of the second portions of the first address type stored in the first Address Directory; and
   in response to the at least a second portion of an address of the load or store instruction matching one of the plurality of the second portions of the first address type stored in the first Address Directory, supply the Way bit field of the second portion of the first address type stored in the first Address Directory that matches the at least second portion of an address of the load or store instruction to the store reorder queue or the load reorder queue.

3. The computer system of claim 1, wherein the processor is further configured to:
   determine whether a first portion of the first address type of the load or store instruction matches one of the rows of the first Address Directory;
   in response to the first portion of the first address type of the load or store instruction matching one of the rows of the first Address Directory, reading out each second portion of the first address type in each of the first Address Directory Ways of that matching row;
   sending each second portion of the first address type read out of each of the first Address Directory Ways to a Directory Way Compare Unit;
   comparing each second portion of the first address type sent to the Directory Way Compare Unit by the first Address Directory to at least a second portion of the address of the store or load instruction; and
   in response to the at least a second portion of the address of the load or store instruction matching one of the second portions of the first address type sent to the Directory Way Compare Unit by the first Address Directory, supply the Way bit field of the matching second portion of the first address type stored in the first Address Directory to the store reorder queue or the load reorder queue.

4. The computer system of claim 1, wherein the processor is configured to:
   determine whether at least a second portion of an address of the load or store instruction matches one of the plurality of the second portions of the first address type stored in the first Address Directory; and
   in response to the at least a second portion of the address of the load or store instruction not matching one of the plurality of the second portions of the first address type stored in the first Address Directory, allocate a data cache entry including a data cache Way to contain the data associated with the load or store instruction, and allocate a first Address Directory entry including a first Address Directory Way corresponding to the data cache entry and data cache Way.

5. The computer system of claim 4, wherein the processor is further configured to supply the store reorder queue or the load reorder queue at least one of: (a) the data cache Way bit field corresponding to the data cache Way that was allocated; (b) the first Address Directory Way bit field corresponding to the first Address Directory Way that was allocated; and
   (c) combinations thereof.

6. The computer system of claim 1, wherein the first address type is an effective address that correlates with a second address type that identifies a physical location in a memory system.

7. The computer system of claim 1, further comprising a second Address Directory to store a plurality of second portions of a second address type corresponding to the data stored in the data cache and corresponding to the second portion of the first address type stored in the first Address Directory, the second Address Directory having a plurality of entries equal in number to the plurality of data cache entries and to the plurality of the first Address Directory entries, the second Address Directory having a plurality of rows and Ways equal in number to the plurality of data cache rows and data cache Ways and equal in number to the plurality of first Address Directory rows and first Address Directory Ways, each Way in the second Address Directory corresponding to a data cache Way and a first Address Directory Way, identified by the Way bit field, and containing the second portion of the second address type corresponding to and identifying a location in memory where the data stored in the corresponding data cache entry is located.

8. The computer system of claim 7, wherein the processor is configured to:

determine whether at least a second portion of an address of the load or store instruction matches one of the plurality of the second portions of the first address type stored in the first Address Directory;

in response to at least a second portion of an address of the load or store instruction not matching one of the plurality of second portions of the first address type stored in the first Address Directory, determine whether at least a second portion of the address of the load or store instruction matches at least a portion of one of the plurality of the second address type contained in the second Address Directory; and in response to the at least the second portion of the address of the load or store instruction not matching at least one of the plurality of second portions of the second address type contained in the second Address Directory, allocate a data cache entry including a data cache Way to contain the data associated with the load or store instruction, allocate a first Address Directory entry including a first Address Directory Way corresponding to the data cache entry and data cache Way, and allocate a second Address Directory entry including a second Address directory Way corresponding to the first Address Directory entry and the first Address Directory Way.

9. The computer system of claim 7, wherein the processor is further configured to:

determine whether at least a second portion of an address of the load or store instruction matches one of the plurality of the second portions of the first address type stored in the first Address Directory;

in response to at least a second portion of an address of the load or store instruction not matching one of the plurality of second portions of the first address type stored in the first Address Directory, determine whether the first portion of the address of the load or store instruction matches one of the rows in the second Address Directory; and in response to the first portion of the address of the load or store instruction matching one of the rows in the second Address Directory; read out the second portion of the second address type in each of the second Address Directory Ways of that matching row;

send each second portion of each second address type read out of each of the second Address Directory Ways to a Miss Compare Unit;

translate at least the second portion of the first address type of the load or store instruction to a corresponding second portion of the second address type;

compare each second portion of the second address type sent to the Miss Compare Unit by the second Address Directory to the translated second portion of the second address type; and in response to the translated second portion of the load or store instruction not matching one of the second portions of the second address type sent to the Miss Compare Unit by the second Address Directory, supply the Way bit field of the second portion of the second address type stored in the second Address Directory to the store reorder queue or the load reorder queue.

10. The computer system of claim 9, wherein the processor is configured to:

in response to the translated second portion of the address of the load or store instruction matching one of the second portions of the second address type sent to the Miss Compare Unit by the second Address Directory, handle the instruction processing hazard.

11. The computer system of claim 1, wherein the data cache Way bit field is less than six bits.

12. The computer system of claim 1, wherein the processor is configured to process data cache Ways associated with load instructions in the load reorder queue differently than the data cache Ways associated with store instructions in the store reorder queue.

13. The computer system of claim 1, wherein the processor is configured to lock data cache Ways associated with store instructions in the store reorder queue to prevent reallocation of the store queue entry associated with locked data cache Ways.

14. The computer system of claim 13, wherein the processor is configured to reallocate to a second load instruction an entry in the load queue that is in use by a first load instruction.

15. A processor for processing electronic instructions including load and store instructions, the processor comprising:

a load store execution unit (LSU) for processing the load and store instructions, wherein the LSU comprises:

a data cache for storing data for use by the LSU, the data cache having a plurality of entries to store the data, each data cache entry addressed by a row and a Way, the data cache row representing a first portion of an effective address used by the processor to identify a logical location of data, each data cache row having a plurality of Ways, the data cache Ways represented by a Way bit Field;

an EA Address Directory to store a second portion of the effective address used by the processor to identify the logical location of data, the EA Address Directory having a plurality of entries equal in number to the data cache entries, each entry in the EA Address Directory addressed by a row and a Way, each of a plurality of EA Address Directory rows having a plurality of Ways, the plurality of EA Address Directory rows and the plurality of EA Address Directory Ways equal in number to the plurality of data cache rows and the plurality of data cache Ways, each of the EA Address Directory Ways identified by the same Way bit field used to identify a corresponding data cache Way, each EA Address Directory Way containing the second portion of the effective address used by the processor, and each row in the EA Address Directory containing a first portion of an effective address;

a RA Address Directory to store a second portion of a real address used to identify the physical location of data in a memory system, the first EA Address Directory having a plurality of entries equal in number to the data cache entries, each entry in the RA Address Directory addressed by a row and a Way, each of a plurality of RA Address Directory rows having a plurality of Ways, the plurality of RA Address Directory rows and the plurality of RA Address Directory Ways equal in number to the plurality of data cache rows and the plurality of data cache Ways, each of the RA Address Directory Ways identified by the same Way bit field used to identify a corresponding data cache Way, each RA Address Directory Way containing the second portion of the real address, and each row in the RA Address Directory containing a first portion of a real address;

a store reorder queue for tracking the store instructions in the LSU, the store reorder queue having a plurality of entries for storing information for tracking the store instructions, each store reorder queue entry having a Way bit field for identifying the Way in at least one of the group consisting the data cache, the EA Address Directory, the RA Address Directory, or combinations thereof; and a load reorder queue for tracking load instructions in the LSU, the load reorder queue having a plurality of entries for storing information to track the load instruction, each load reorder queue entry have a Way bit field for identifying the Way in at least one of the group consisting of the data cache, the EA Address Directory, the RA Address Directory, and combinations thereof;

wherein the processor is configured to:

allocate one of the plurality of entries in the store reorder queue addressed by at least the Way bit field as a proxy for the second portion of the effective address; and allocate one of the plurality of entries in the load reorder queue addressed by at least the Way bit field as a proxy for the second portion of the effective address.

16. The processor of claim 15, wherein the processor is configured to:

determine whether at least a second portion of an effective address of the load or store instruction matches one of the plurality of the second portions of the effective address stored in the EA Address Directory; and in response to the at least a second portion of the effective address of the load or store instruction matching one of the plurality of the second portions of the effective address stored in the EA Address Directory, supply the Way bit field of the second portion of the effective address stored in the EA Address Directory that matches the at least second portion of the effective address of the load or store instruction to the store reorder queue or the load reorder queue.

17. The computer system of claim 1, wherein the processor is further configured to:

determine whether a first portion of the effective address of the load or store instruction matches one of the rows of the EA Address Directory;

in response to the first portion of the effective address of the load or store instruction matching one of the rows of the EA Address Directory, reading out each second portion of the effective address in each of the EA Address Directory Ways of that matching row;

sending each second portion of the effective address read out of each of the EA Address Directory Ways to a Directory Way Compare Unit;

comparing each second portion of the effective address sent to the Directory Way Compare Unit by the EA Address Directory to at least a second portion of the effective address of the store or load instruction; and in response to the at least a second portion of the effective address of the load or store instruction matching one of the second portions of the effective address sent to the Directory Way Compare Unit by the EA Address Directory, supply the Way bit field of the matching second portion of the effective address stored in the EA Address Directory to the store reorder queue or the load reorder queue.

18. The processor of claim 15, wherein the data cache Way bit field is less than five bits.

19. The computer system of claim 15, wherein the processor is configured to:

determine whether at least a second portion of the effective address of the load or store instruction matches one of the plurality of the second portions of the effective address stored in the EA Address Directory; and in response to the at least a second portion of the effective address of the load or store instruction not matching one of the plurality of the second portions of the effective address stored in the EA Address Directory, allocate a data cache entry including a data cache Way to contain the data associated with the load or store instruction, and allocate an EA Address Directory entry including an EA Address Directory Way corresponding to the data cache entry and data cache Way.

20. The computer system of claim 19, wherein the processor is further configured to supply the store reorder queue or the load reorder queue at least one of: (a) the data cache Way bit field corresponding to the data cache Way that was allocated; (b) the EA Address Directory Way bit field corresponding to the EA Address Directory Way that was allocated; and (c) combinations thereof.

21. A computer system for processing information, the computer system comprising:

at least one processor;

a load store execution unit (LSU) for processing load and store instructions, the LSU comprising:

a data cache having a plurality of entries to store data, each data cache entry addressed by a row and a Way identified by a Way bit field, the Way bit field not being greater than five bits in width;

a data cache directory having a plurality of entries to store an effective address corresponding to the memory location of data, the data cache directory organized the same as the data cache where each data cache directory entry is identified by a directory row and a directory Way identified by a directory Way bit field, the directory Way bit field being the same as the data cache Way bit field;

a store reorder queue for tracking the store instructions in the LSU, the store reorder queue having a plurality of entries having a Way bit field for identifying the data cache directory Way;

a load reorder queue for tracking the load instructions in the LSU, the load reorder queue having a plurality of entries having a Way bit field for identifying the data cache directory Way;

one or more computer readable non-transitory storage media; and programming instructions stored on the one or more computer readable non-transitory storage media for execution by the at least one processor, the programming instructions when executed cause the processor to:

allocate one of the plurality of entries in the store reorder queue addressed by at least the Way bit field as a proxy for a portion of the effective address; and allocate one of the plurality of entries in the load reorder queue addressed by at least the Way bit field as a proxy for a portion of the effective address.

22. The computer system of claim 21, further comprising programming instructions that when executed cause the processor to:

determine whether at least a portion of the effective address of the load or store instruction matches a portion of one of the plurality of effective addresses stored in the data cache directory;

in response to the at least a portion of the effective address of the load or store instruction matching a portion of one of the plurality of effective addresses stored in the data cache directory, supply the Way bit field of the matching effective address stored in the data cache directory to the store reorder queue or the load reorder queue; and in response to the at least a portion of the effective address of the load or store instruction not matching a portion of one of the plurality of effective addresses stored in the data cache directory, (a) allocate a data cache entry including a data cache Way to contain the data associated with the load or store instruction, (b) allocate a data cache directory entry including a data cache directory Way corresponding to the data cache entry and the data cache Way, and (c) supply the store reorder queue or the load reorder queue the data cache Way bit field.

23. The computer system of claim 21, further comprising programming instructions that when executed cause the processor to:
lock data cache Ways associated with store instructions in the store reorder queue to prevent reallocation of the store queue entry associated with locked data cache Ways; and
reallocate an entry in the load queue that is in use to a second load instruction.

24. A method of processing data in a processor, comprising:
in a load store unit for processing load and store instructions, determine whether a portion of a logical address stored in one of a plurality of Ways in an Address Directory matches a portion of the address of a load or store instruction; and
in response to the portion of the logical address stored in one of the plurality of entries in the Address Directory matching a portion of the address of the load or store instruction, supply a Way bit field of the Way that stored the matching logical address to:
a load reorder queue in response to processing a load instruction; and
a store reorder queue in response to processing a store instruction.

25. The method of claim 23, further comprising:
locking data cache Ways associated with store instructions in the store reorder queue to prevent reallocation of the store queue entry associated with locked data cache Ways; and
reallocating an entry in the load queue that is in use to a second load instruction.

* * * * *